United States Patent

[11] 3,603,637

[72] Inventor Joe A. DePinto
 Box 354, New Bedford, Pa. 16140
[21] Appl. No. 789,145
[22] Filed Jan. 6, 1969
[45] Patented Sept. 7, 1971

[54] ADJUSTABLE ARM REST FOR AUTOMOBILES
 2 Claims, 4 Drawing Figs.
[52] U.S. Cl. ........................................ 296/153, 248/243
[51] Int. Cl. .......................................... B60j 9/00
[50] Field of Search ............................. 296/153; 248/243, 245

[56] References Cited
UNITED STATES PATENTS
1,706,634  3/1929  Seils ..................... 296/153
1,760,450  5/1930  Taylor .................... 296/153
3,129,974  4/1964  Carter .................... 296/153
1,080,639  12/1913  Kurtzon .................. 248/243
1,254,094  1/1918  Vogt ...................... 248/243
1,760,503  5/1930  Knape ..................... 248/243

FOREIGN PATENTS
1,016,138  4/1950  France ................... 296/153

Primary Examiner—Benjamin Hersh
Assistant Examiner—Robert R. Song
Attorney—Webster B. Harpman ABSTRACT: An adjustable arm rest including hanger brackets engageable in the window openings of an automobile door and an elongated horizontal arm support portion adjustably secured thereto.

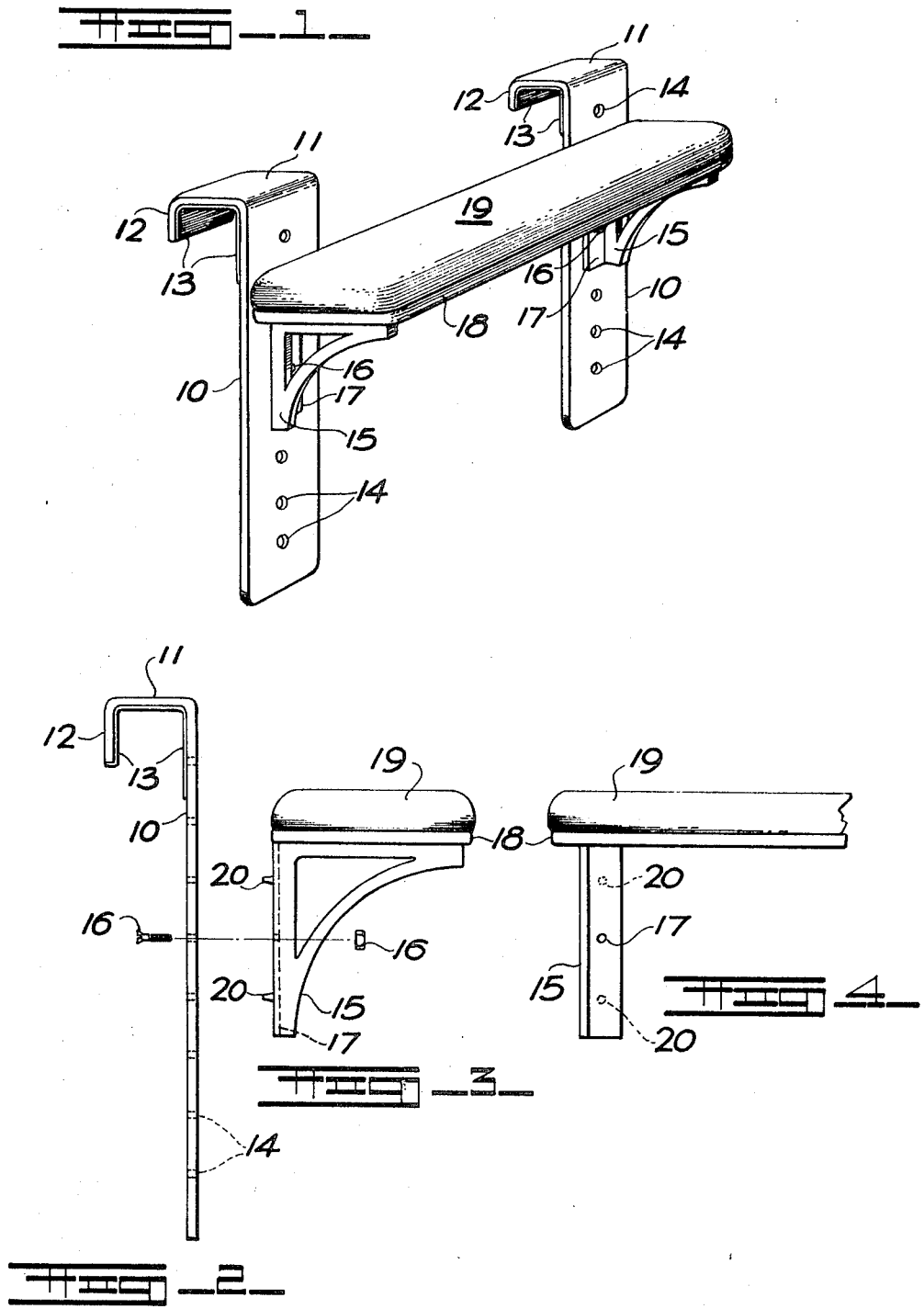

ADJUSTABLE ARM REST FOR AUTOMOBILES

BACKGROUND OF THE INVENTION

1. Field of the Invention

This invention relates to an arm rest attachable to a door in an automobile and usable by the driver or passenger.

2. Description of the Prior Art

Prior structures of this type have generally been attached to the automobile door in fixed position thereon. Several proposals have been made to provide adjustable arm rests (see U.S. Pat. Nos. 3,129,974 1,706,634 and 1,742,447).

This invention eliminates the cumbersome and awkward constructions and provides in place an easier installed universally adaptable arm rest for an automobile door or the like, which permits the arm support portion to be adjusted vertically from a position above the window opening to a substantially spaced lowermost position.

SUMMARY OF THE INVENTION

An adjustable arm rest for an automobile comprising a pair of hanger brackets having inverted U-shaped hook configurations on their upper ends, a pair of platform supporting assemblies adjustably mounted on the hanger brackets and an arm support portion carried by said platform supporting assemblies. The hanger brackets have a plurality of vertically spaced openings for selective engagement with fasteners on the platform supporting assemblies and the arm support portion carried on the platform supporting assemblies is cushioned.

DESCRIPTION OF THE DRAWINGS

FIG. 1 is a perspective view of the adjustable arm rest for automobiles;

FIG. 2 is an end elevation of one of the hanger brackets seen in FIG. 1;

FIG. 3 is an end view of a platform support assembly and an arm support portion mounted thereon as seen in FIG. 1; and FIG. 4 is a front elevation with parts broken away showing one of the platform supporting assemblies and arm support portions thereon.

DESCRIPTION OF THE PREFERRED EMBODIMENT

In its simplest form the adjustable arm rest for automobiles is comprised of a pair of spaced hanger brackets 10, each of which has an out turned portion 11 and a downturned portion 12 on its upper end defining a hook configuration. The inner surfaces of the upper ends of the hanger brackets 10 including the horizontal and vertical surfaces of the out turned portions 11 and downturned portions 12 are provided with a cushioning material 13. The hook configurations formed on the upper ends of the hanger brackets 10 as just described are of a size capable of enabling the downturned portions 12 to register in the window opening or slot in the automobile door when the main vertical portions of the hanger brackets 10 are positioned on the inner surface of the door.

Those skilled in the art will observe that the customary automobile door and window construction provides a slotlike opening through which the window is moved vertically and that the slotlike opening is of sufficient width to easily receive and retain the downturned portions 12 of the hanger brackets 10.

Each of the hanger brackets 10 is provided with a plurality of vertically spaced openings 14 and a pair of platform arm rest supports 15 are movably affixed, one to each of the hanger brackets 10 by fasteners 16 positioned through apertures in the platform supports 15 and the openings 14 in the hanger bracket 10.

As best illustrated in FIG. 1 of the drawings, the platform arm rest supports 15 are flanged as at 17 and the fasteners 16 are positioned through apertures formed in the flanges 17. The platform arm rest supports 15 are generally triangular in end elevation with the base triangle preferably forming a curve as illustrated in the drawings and FIG. 3 in particular. The uppermost surfaces of each of the platform supports 15 is removably secured to an arm support portion 18, the uppermost part of which is cushioned and covered with an upholstery material 19.

In FIG. 2 of the drawings an end elevation of one of the hanger brackets 10 may be seen and a fastener 16 in the form of a flat headed bolt is shown in alignment with one of the openings 14 in the hanger bracket 10.

In FIG. 3 of the drawings the platform arm rest supports 15 are shown with projecting pins 20 on their flanges 17, it being observed that the pins 20 are in alignment with others of the spaced openings 14 and registerable therewith.

By referring now to FIGS. 2 and 3 of the drawings it will be seen that the fastener 16 takes the form of a bolt and a nut and that they are illustrated on a common centerline extending through one of the openings 14 in the hanger bracket 10 and the opening in the flange 17 of the platform support 15.

It will occur to those skilled in the art that when the platform support 15 is positioned on the hanger bracket 10 with the pins 20 in engagement with two of the openings 14, the fastener 16 may then be positioned through the intermediate opening 14 and the opening in the platform support 15 and the assembly thus held in any desired position relative to the hanger bracket 10.

In FIG. 4 of the drawings the partial front elevation of the adjustable arm rest for automobiles illustrates the flange 17 and the opening through which the fastener 16 is positioned while broken lines illustrate the positioning of the integral pins 20.

It will thus be seen that a simple and practical adjustable arm rest for automobiles has been disclosed wherein the device may be positioned on an automobile door or an interbody surface adjacent a window opening and suspended by the hook portions engaging the window opening. It will also be seen that the arm support portion 19 is adjustable vertically and that either end of it may be positioned higher or lower than the other by reason of the movable attachment between the arm support portion and the platform support therebeneath. Thus, the driver and/or the passenger in the automobile equipped with the device can adjust the arm rest to the particular position and arrangement found most suitable.

Although but one embodiment of the present invention has been illustrated and described it will be apparent to those skilled in the art that various changes and modifications may be made therein without departing from the spirit of the invention.

I claim:

1. An arm rest support means for removably and adjustably attaching same to a lower portion of an automotive or like window frame having a similar pair of hanger brackets and a similar pair of arm rest supports, and a rectangularly shaped arm rest on the supports comprising:
   a. the pair of hanger brackets each being horizontally spaced apart and elongate, wide and flat,
   b. each hanger bracket having an integral similar hook at its upper end for engagement with the lower portion of the window frame of the automotive vehicle or the like, and each hanger having a depending portion thereof with a plurality of spaced-apart vertically aligned openings therein,
   c. the pair of integral arm rest supports each having a top horizontally extending arm and supporting said arm rest thereon and further including a downwardly extending right angularly shaped corner portion with an integral flat elongated flange thereof with an opening therein substantially medially of its length and with said flange in engagement with an adjacent flat portion of the respective brackets, and the width and length of each arm rest support including its flange being considerably less than the respective widths and lengths of each hanger bracket,
   d. each flat flange of the arm supports having a pair of spaced-apart outwardly projecting pins on an outer face thereof and with the opening in the flange spaced medially of the pins,
e. and the spacing of all of the openings in each bracket and the spacing of the pins on the flange being such that the spaced pins will properly fit into the proper spaced openings in the bracket and the opening in the flange of the arm rest and an opening in each bracket will be registered one with the other, and
f. removable and replaceable securing means extending through an adjacent opening in the bracket in registry with the opening in the flange of the arm rest support to secure the bracket and the arm rest to one another and with said pins preventing relative rotative movement of the arm rest supports with respect to the hanger brackets.

2. The arm rest support as defined in and by claim 1 wherein the spaced pins on the arm rest and the opening in the flange of the arm rest and the removable and replaceable securing means allow for a vertical adjustment of the arm rest on each hanger bracket and wherein the top portion of the arm rest is substantially in the same plane with the hook top portion of each hanger bracket.